Oct. 11, 1949.  J. E. REBOURS  2,484,312
HOUSE TRAILER CONSTRUCTION
Filed April 22, 1946  3 Sheets-Sheet 1

INVENTOR
JULES E. REBOURS
BY Liverance and
Van Antwerp
ATTORNEYS

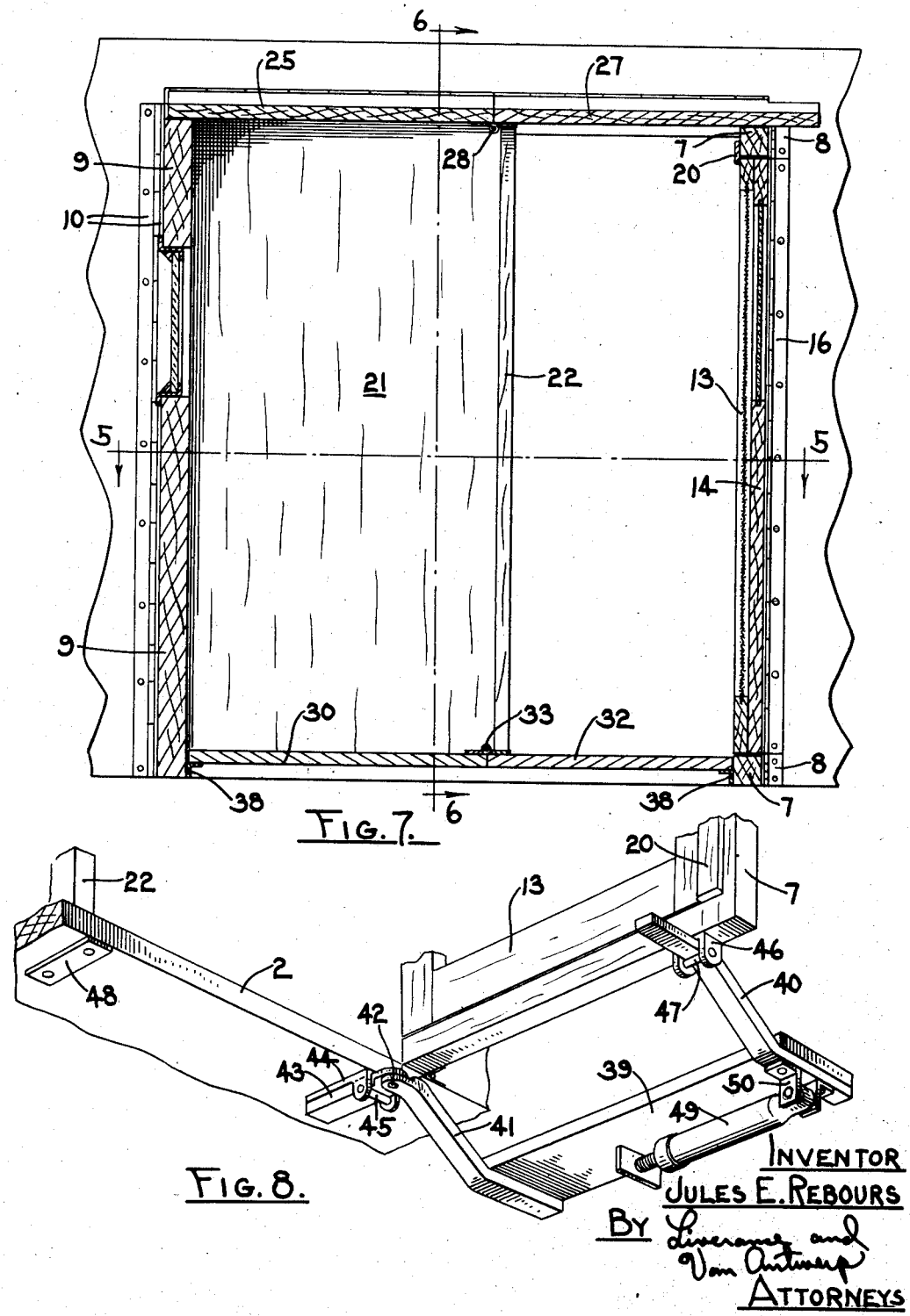

Patented Oct. 11, 1949

2,484,312

UNITED STATES PATENT OFFICE 2,484,312

HOUSE TRAILER CONSTRUCTION

Jules E. Rebours, Grand Rapids, Mich.

Application April 22, 1946, Serial No. 663,977

2 Claims. (Cl. 296—23)

This invention relates to a house trailer construction and more particularly to a trailer construction in which portions of the trailer body may be unfolded to provide for an additional room or rooms.

In the use of a house trailer, particularly when used as a residence, it is desirable to have an extra room, and it is especially desirable to have an entrance room or vestibule in which dirty clothes may be changed for clean clothes and in which the soles of the shoes of the person entering may be cleaned or in which a chemical toilet or shower bath may be installed. A vestibule is particularly desirable in cold weather in that it conserves the heat within the trailer, in that a person may first enter the vestibule and thereafter enter the trailer, thereby preventing the escape of heat from the interior of the trailer.

The primary object of the present invention is to provide a trailer body with foldable sections, receivable in a receptacle therein, which are hinged to the trailer body unfoldable to form an additional room.

Another object is to provide means whereby substantially all of the foldable sections are hinged directly or indirectly to the trailer body, there being only one loose panel section which is divided and hinged for easy storage.

Another object is to provide means for folding the room panels into a receptacle in the wall of the trailer body and when folded, only slightly alters the appearance of the trailer body from the conventional design.

A still further object is to provide means whereby the door of the trailer body may be used for the door of the unfolded room and wherein the screen door may be used as the door for the trailer body.

A still further object is to provide a step to aid in entering or leaving the trailer or extended room, which is retractable and extendable, and which is useful both when the room is folded or unfolded.

Further objects and advantages of the present invention will become apparent during the following description, in which Fig. 1 is a side elevational view of a house trailer having the construction of my invention incorporated therein, showing the trailer in condition for traveling.

Fig. 7 is a vertical longitudinal sectional view through the unfolded room taken along line 7—7 in Fig. 6 looking in the direction of the arrows, and Fig. 8 is a fragmentary perspective view looking at the side of a portion of the trailer body floor and door frame showing the novel construction of step used with the extendable room.

Figure 1:
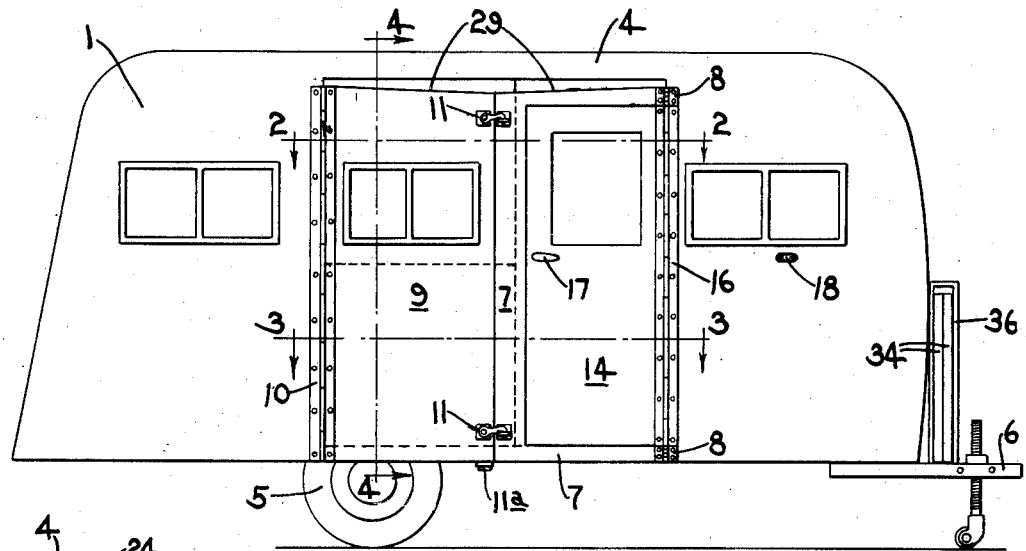

Referring in detail to the drawings, in which like reference numerals refer to like parts throughout the several views, the trailer body 1 is provided with a floor 2, a side wall 3 and a roof 4. The body is also provided with wheels 5 and with a hitch 6 whereby the house trailer may be towed from place to place as desired.

Figure 2:
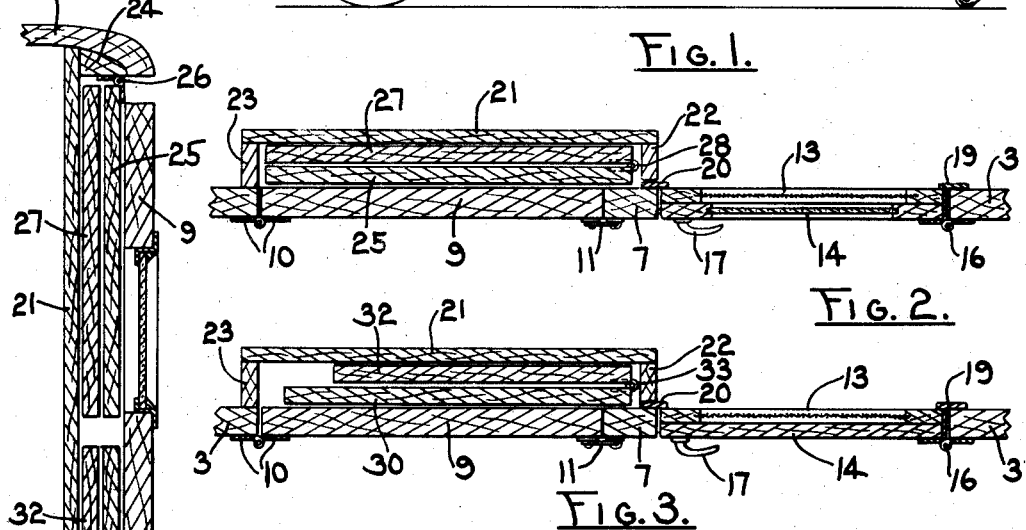
Fig. 2 is a horizontal sectional view through the side of the trailer showing the extendable room folded taken along line 2—2 in Fig. 1, looking in the direction of the arrows.
Figure 3:
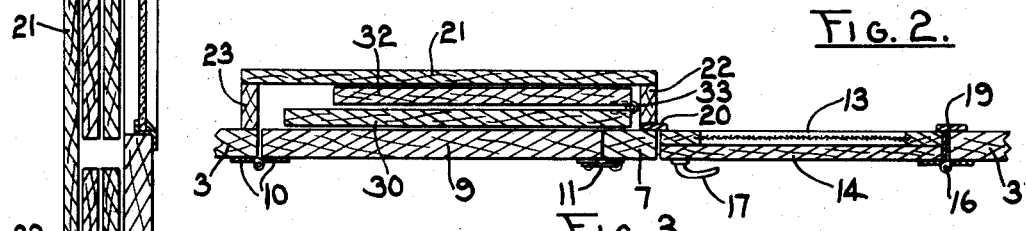
Fig. 3 is a similar view taken along line 3—3 in Fig. 1.
Figure 4:
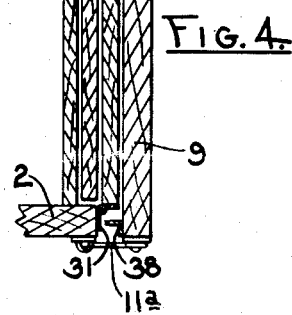
Fig. 4 is a vertical sectional view through the side of the trailer body with the room in folded position taken along line 4—4 in Fig. 1, in the direction indicated.

A panel 7 is pivotally connected on the hinges 8 to the side wall 3 of the trailer body and another panel 9 is also hingedly connected on hinges 10 which may be of the concealed type and these panels 7 and 9 are pivotally movable in line with the side wall of the trailer 3 as shown in Figs. 1, 2 and 3 and are held in this position by means of latches 11 and 11a, the latches 11 attached to each of the panels near their adjacent edges, the latch 11a attached to the lower edge of panel 9 and to the bottom 2 of the trailer. Panels 7 and 9 are also pivotal at 180 degrees thereto to lie adjacent the outer face of the wall 3 or to any position therebetween.

The panel 7 is provided with a door opening 12 into which is hingedly received, a screen door 13 and an outer door 14 both hingedly mounted on a common hinge 16 which may also be of the concealed type attached to the screen and the door and to the side wall 3 of the trailer body. The door 14 is provided with a latch handle 17 whereby the door may be latched within the door opening 12 and a catch 18 is secured to the outer face of the wall 3 engageable with the latch handle 17 to hold the door in fully open position. The screen door 13 when closed with panel 7 in closed or folded position engages the door stop 19 attached to the trailer wall 3, and also engages the door stops 20 attached to the panel 7, and engages stops 20 only when the panel 7 is in extended or unfolded position.

A receptacle is provided in the side wall 3 of the trailer body for the reception of the folded roof and folded floor and comprises a back panel 21 and end partitions 22 and 23, the floor 2 forming the bottom of the receptacle and a filler block 24 forming the top of the receptacle.

Figures 5, 6:
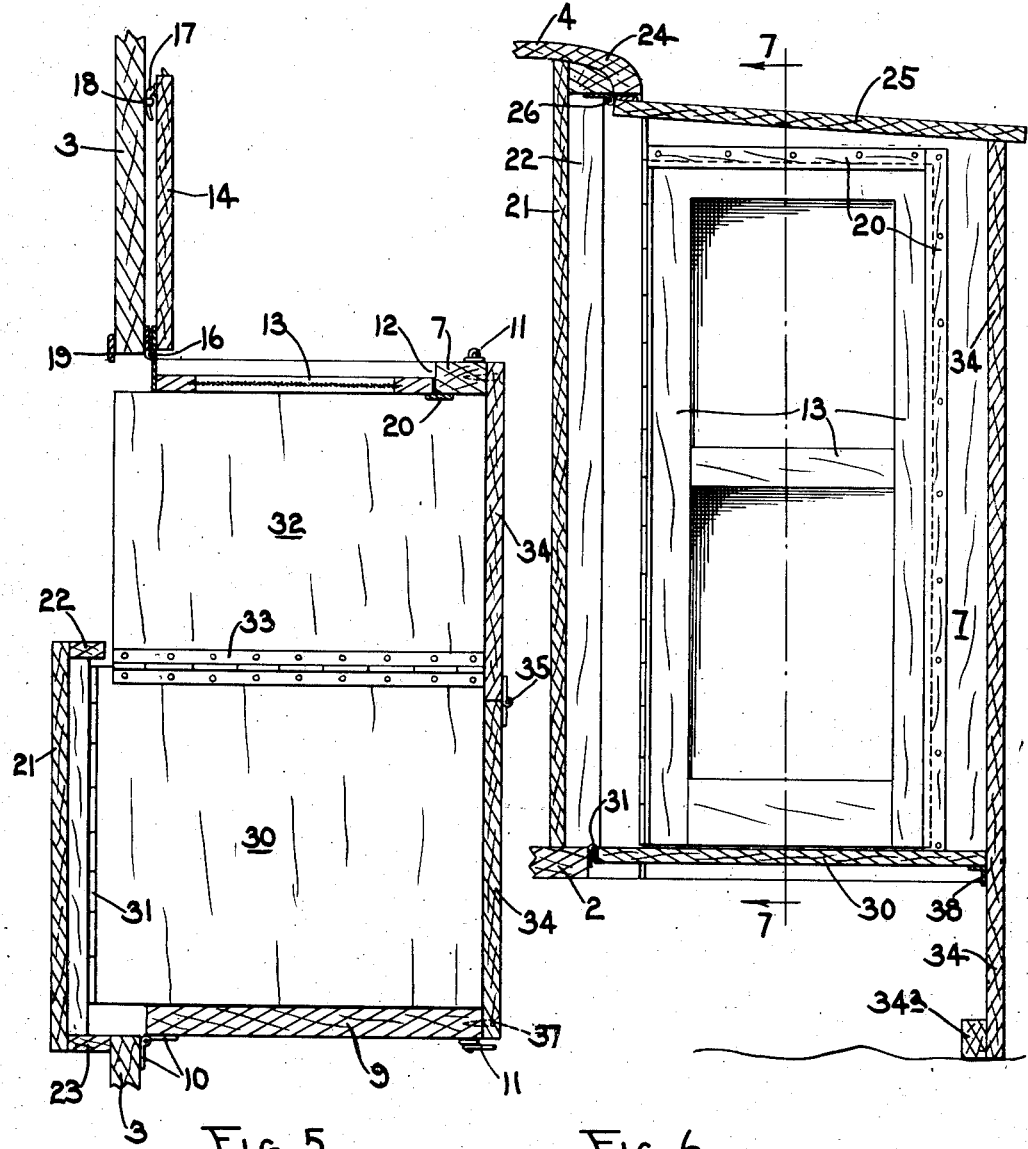
Fig. 5 is a horizontal sectional view through the side of the trailer body and foldable room showing the room in unfolded or extended position taken along line 5—5 in Fig. 7, looking in the direction indicated by the arrows.
Fig. 6 is a vertical sectional view through the side of the trailer body and the foldable room with the room in unfolded position taken along line 6—6 in Fig. 7 in the direction indicated.

The roof portion of the extendable room is provided with a panel 25 pivotally connected on a hinge 26 to the filler block 24 and another roof panel 27 is pivotally connected to the forward edge of the roof panel 25 by means of a hinge 28 secured to each of the panels 25 and 27. The roof panels 25 and 27 are adapted to pivot outwardly on the hinge 26 to substantial horizontal position, and the panel 27 is adapted to pivot downwardly and forwardly to a position in line with the panel 25 wherein it forms the roof section as shown in Figs. 6 and 7. The upper edges of the panels 7 and 9 are formed at a slight angle as indicated by numeral 29 whereby when the roof panels are supported thereon they will lie at a slight outward and downward incline for the proper drainage thereof. The floor panels 30 and 32 are adapted to pivot outwardly and downwardly on hinge 31 to horizontal position, and panel 32 is adapted to pivot upwardly and forwardly on hinge 33 to a position in line with floor panel 30 wherein it forms the floor section as shown in Figs. 6 and 7.

The outer wall of the extendable room is formed by the divided panels 34 which are pivotally connected together by means of a hinge 35 secured thereto at their adjacent edges, whereby the panels 34 may be folded to be received in a rack 36 when not in use as a wall for the extendable room. This rack 36 is attached to the forward end of the trailer and to the top side of the hitch in a convenient position for the storage of wall panels 34. The wall panels 34 when in the proper position to form a side wall of the extendable room are held in position against the outer edges of the panels 7 and 9 by means of the screws 37 or any other convenient form of attachment. The wall panels 34 are provided with a foot 34a along their lower edge to prevent the edge thereof from sinking into the ground. Each of the panels 7, 9 and 34 are provided with the angle members 38 secured thereto to support the floor when the room is in unfolded position.

As shown in Fig. 8, the trailer body is provided with a step 39 which is secured to and supported by the parallel Z-shaped supporting bars 40 and 41. The supporting bar 41 is mounted at 42 for horizontal pivotal movement on the slide bar 43. This bar 43 is mounted for sliding movement against the under side of a bracket 44 secured to the under side of the floor of the trailer and is held upwardly thereagainst by means of the rod 45 attached to a bracket 44. The supporting bar 40 is slidably received in a bracket 46 secured to the lower edge of the panel 7 and is supported therein by means of a rod 47 secured to the bracket 46. When the step is in use while the extendable room is in unfolded position, the outer end of the step is provided with additional support in the form of a screw jack 49 which is pivotally mounted at the lower side of the step 39 on the brackets 50, whereby the jack may be moved to horizontal ineffective position against the lower side of the step 39 or may be moved to vertical position to engage the ground and support the outer end of the step.

When traveling with the house trailer, the extendable room is folded to the position as shown in Figs. 1, 2, 3 and 4 and in this position, the roof panels 25 and 27 are folded into the upper part of the receptacle and the floor panels 30 and 32 are folded into the lower part of the receptacle. The panels 7 and 9 are latched together by means of latches 11 at their adjacent edges whereby the opening in the side of the wall 3 and the receptacle is closed. Also while traveling, the foldable wall panels 34 are located in the rack 36 in folded position.

After the trailer has been properly located and detached from the towing automobile and it is desired to unfold the extendable room, the panels 7 and 9 are unlatched at 11 from each other and pivoted outwardly 180 degrees so that they will lie flat against the outer side of the wall 3 of the trailer body. The roof panels 25 and 27 are then pivoted outwardly on hinge 26 to substantial horizontal position and the panel 27 is thereafter pivoted downwardly and forwardly on the hinge 28 at the forward edge of the roof panel 25 to a substantially horizontal position in line with the roof panel 25. With the roof panels 25 and 27 thus held, the end panels 7 and 9 are pivoted inwardly to a position at right angles to the face of the wall 3 of the trailer body and the roof panels 25 and 27 are then lowered whereby they are supported on the upper edges of the panels 7 and 9. It will be noted from Figs. 6 and 7 that in this position, the outer edges of the roof panels overhang the side and front of the room to allow water to drain from the roof without entering the room. It will also be noted that in this position the inner edges of the roof panels 25 and 27 extend a distance inside the outer edge of the roof, thereby preventing rain from entering the room along the inner edge of the roof.

The floor panels 30 and 32 are pivoted outwardly on the hinge 31 until the panel 30 is supported on the angle brackets 38 on the end panel 9. The floor panel 32 is then pivoted upwardly, forwardly and downwardly around the hinge 33 until it is supported in a horizontal position in alinement with the floor panel on the angle bracket 38 secured to the end panel 7.

The outer wall panels 34 are next removed from the rack 36 and are pivoted into alinement and placed in position against the outer edges of the end panels 7 and 9 and the floor panels 30 and 32. The lower edges of the wall panels 34, with the foot 34a thereon, rest on the ground and the outer edges of the floor panels 30 and 32 are supported on the angle brackets 38 secured to the inner face of the wall panels 34. The wall panels 34 are then secured to the edges of the panels 7 and 9 by means of the screws 37.

With the extendable room in unfolded position, the door 14 may be used in the usual manner to enter or leave the room and the screen door 13 may be used in the usual manner. In cold weather the door stops 20 may be removed to allow the screen door 13 to swing across the opening in the side of the wall 3 of the trailer body and the screen door may be covered with weather-proofing material whereby a weather-proof door will be provided between the interior of the trailer and the extendable room whereby with the outer door 14 of the extendable room closed before the screen door is opened to the interior of the trailer, conservation of the heat within the trailer body is accomplished.

The step for the trailer as shown in Fig. 8 is adapted to be moved to retracted or extended position and when the extendable room is in folded position as shown in Fig. 1, the step may be retracted by lifting the step and pushing it inwardly, or moved to position for use by pulling the step outwardly and allowing it to drop with the side bar 43 engaging the under side of bracket 44 and the inner end of supporting bar 40 engaging the under side of the plate 48. When the extendable room is moved to unfolded position as shown in Fig. 8, the supporting bar 41 for the step will pivot at 42 on the slide bar 43 and the supporting bar 40 becomes entirely detached from the body of the trailer. In this position, the step is supported at one end by the supporting bar 41 secured to the slide bar 43 and at its outer end, the step is supported on the supporting bar 40 which is supported in the bracket 46. In this unfolded position of the room, the outer end of the step is provided with an additional support by providing the screw jack which is movable to vertical position under the outer end of the step and is adjustable to support the step at the proper height.

Having thus described my invention, the particular construction which I claim new is defined in the appended claims and is to be considered comprehensive of all forms of structure coming within their scope.

I claim:

1. A vehicle body having a vertical wall with an entrance opening therein, a knockdown vestibule attached to the exterior of said wall and enclosing said entrance opening, said vestibule having a second entrance opening in a wall adjacent said first entrance opening, a door casing having a door hinged thereto, said door casing being hinged to said vehicle wall adjacent said first entrance opening in a position to move to close either one of said entrance openings and said hinged door being operable in either position of the casing.

2. A vehicle body having a vertical wall with an entrance opening therein, an outwardly opening chamber in said wall adjacent said opening, and a knockdown vestibule including a roof hinged to said wall at the top of said chamber, a floor hinged to said wall at the bottom of said chamber, an end panel hinged to said wall at a vertical side of said chamber, said roof and said floor being swingable into said chamber and said end panel being swingable to close said chamber, said vestibule having an entrance opening adjacent the entrance opening in said wall and a door casing having a hinged door thereon and swingable to close either one of said entrance openings.

JULES E. REBOURS.

REFERENCES CITED

The following references are of record in the file of this patent:

UNITED STATES PATENTS

| Number | Name | Date |
|---|---|---|
| 1,156,693 | Koger | Oct. 12, 1915 |
| 1,289,801 | Jones | Dec. 31, 1918 |
| 1,305,162 | Puff | May 27, 1919 |
| 1,435,251 | Moore | Nov. 14, 1922 |
| 1,437,172 | Curtiss | Nov. 28, 1922 |
| 1,796,112 | McArthur, Jr. | Mar. 10, 1931 |
| 2,001,802 | Spettel | May 21, 1935 |
| 2,148,270 | Koets | Feb. 21, 1939 |
| 2,324,507 | Johnson | July 20, 1943 |

FOREIGN PATENTS

| Number | Country | Date |
|---|---|---|
| 105,817 | Australia | Nov. 14, 1938 |
| 333,040 | Great Britain | Aug. 7, 1930 |
| 523,333 | Great Britain | July 11, 1940 |
| 723,940 | France | Jan. 23, 1932 |